United States Patent [19]
Morita et al.

[11] Patent Number: 5,150,316
[45] Date of Patent: Sep. 22, 1992

[54] ELECTRONIC APPARATUS

[75] Inventors: Akitaka Morita, Nara; Eichika Matsuda, Yamatotakada; Toshiro Oba, Nara; Yoshimitsu Inamori, Yamatokoriyama, all of Japan

[73] Assignee: Sharp Kabushiki Kaisha, Osaka, Japan

[21] Appl. No.: 489,883

[22] Filed: Mar. 7, 1990

Related U.S. Application Data

[63] Continuation of Ser. No. 228,270, Jul. 21, 1988, abandoned.

[30] Foreign Application Priority Data

Jul. 21, 1987 [JP] Japan .................. 62-111449[U]

[51] Int. Cl.$^5$ ................................. G06F 3/00
[52] U.S. Cl. .................................. 364/709.12
[58] Field of Search ........... 364/200 MS File, 705.06, 364/706, 709.11, 709.12, 709.01, 709.14, 709.07, 709.15, 709.16; 235/145 R

[56] References Cited

U.S. PATENT DOCUMENTS

| | | | |
|---|---|---|---|
| 3,553,445 | 1/1971 | Hernandez et al. | 364/709.12 |
| 3,878,380 | 4/1975 | Tsuiki | 364/710.11 |
| 4,511,987 | 4/1985 | Caldwell et al. | 364/709.12 |
| 4,530,068 | 7/1985 | Nakanishi et al. | 364/706 |
| 4,553,219 | 11/1985 | Ueno | 364/709.16 |

FOREIGN PATENT DOCUMENTS 60-122459  6/1985  Japan .................. 364/706

OTHER PUBLICATIONS

D. Ewing et al., "Using 1-2-3 ® Special Edition", by Que ™ Corporation, published in 1987, pp. 14, 149–150, 154, 255–256.
Exhibit A, "1-2-3 ® output".

Primary Examiner—Dale M. Shaw
Assistant Examiner—Long T. Nguyen
Attorney, Agent, or Firm—Birch, Stewart, Kolasch & Birch

[57] ABSTRACT

An electronic data storage device and calculator apparatus having a memory for storing numerical data including numerical information and non-decimal point symbols for separating predetermined groups of digits of a numerical value into an easily read form. The data stored also includes character information and is displayed on four lines of an LCD display. Upon selecting one of the displayed data, a reverse video display of the selected data occurs whereupon the remaining displayed data is cleared from the display so that it can be used for calculating purposes using the selected data remaining on the display.

13 Claims, 5 Drawing Sheets

FIG. 1
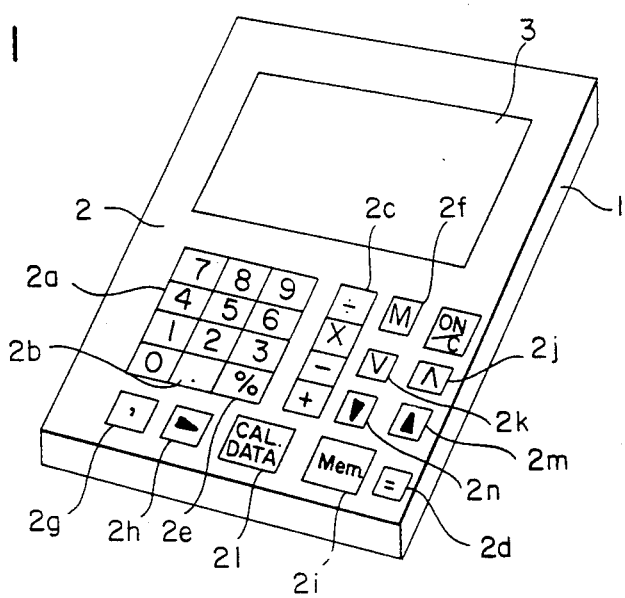
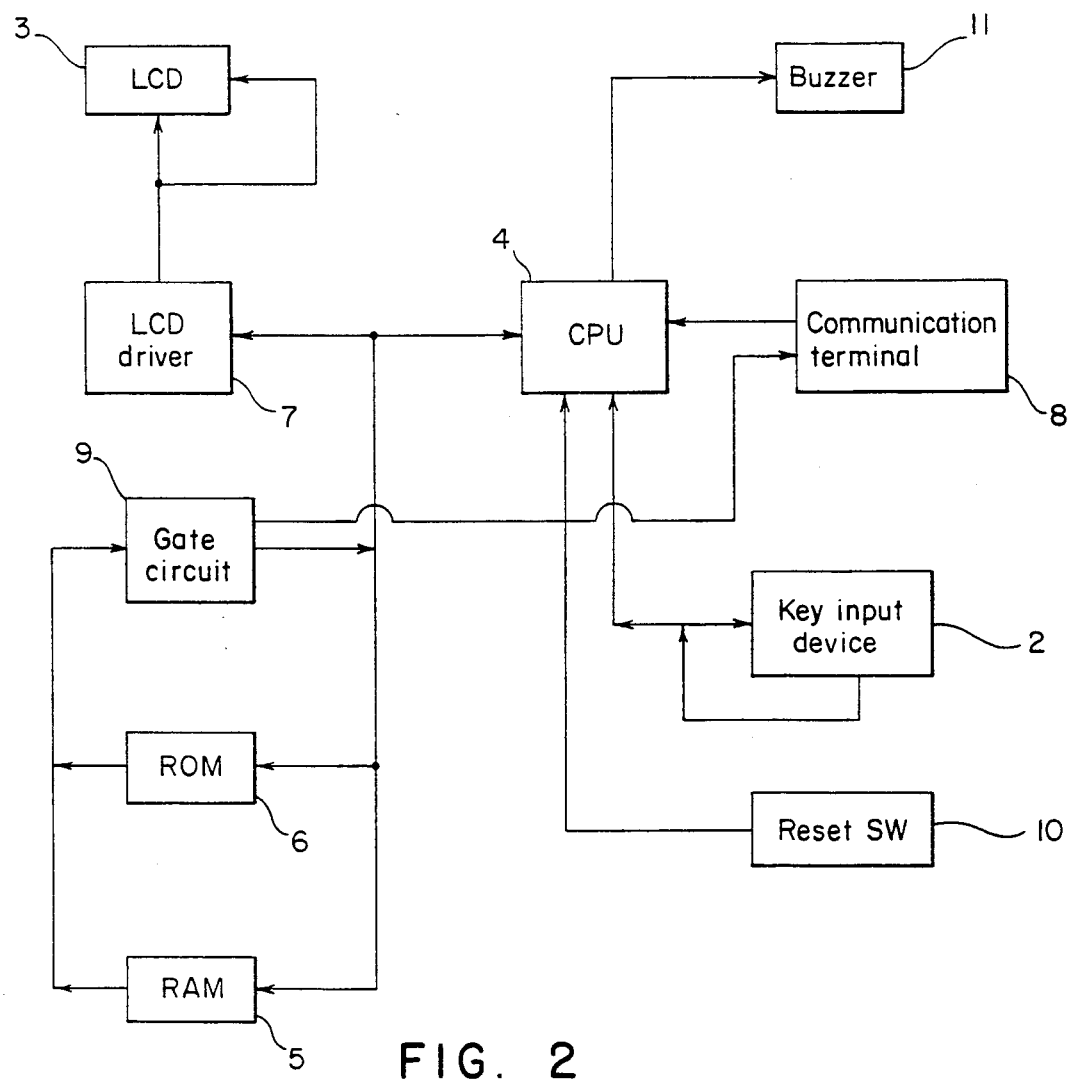
FIG. 2

FIG. 3(a) [MEM.] [V]

| Notebook ► | ¥100 |
|---|---|
| Pencil ► | ¥50 |
| Eraser ► | ¥30 |
| Ruler ► | ¥20 |

FIG. 3(b) [CAL. DATA]

| Note-book ► | ¥100 |
|---|---|
| Pencil ► | ¥50 |
| Eraser ► | ¥30 |
| Ruler ► | ¥20 |

(Reversed display)

FIG. 3(c) [▼]

| Pencil ► | ¥50 |
|---|---|
| Eraser ► | ¥30 |
| Ruler ► | ¥20 |

FIG. 3(d) [X]

Pencil ► ¥50
— M —
50.

FIG. 3(e) [5]

Pencil ► ¥50
— M —
5.

FIG. 3(f) [=]

Pencil ► ¥50
— M —
250.

FIG. 5(a) [MEM.] [V]

```
Desk    ►    ¥20,000
Chair   ►    ¥10,000
Table   ►    ¥25,800
```

FIG. 5(b) [CAL. DATA]

```
Desk    ►    ¥20,000
Chair   ►    ¥10,000
Table   ►    ¥25,800
```

FIG. 5(c) [▼]

```
Chair   ►    ¥10,000
Table   ►    ¥25,800
```

FIG. 5(d) [X]

```
Chair   ►    ¥10,000
            —M—
            10000.
```

FIG. 5(e) [8] [0]

```
Chair   ►    ¥10,000
            —M—
            80.
```

FIG. 5(f) [%]

```
Chair   ►    ¥10,000

8000.
```

ELECTRONIC APPARATUS

This application is a continuation of application Ser. No. 07/228,270 filed on Jul. 21, 1988, now abandoned.

BACKGROUND OF THE INVENTION

This invention relates to an electronic apparatus such as an electronic data storage device and calculator.

In an electronic data storage device and calculator, a user may input a numerical value with a place-dividing symbol "," other than a decimal point which is used for separating convenient groups of digits such as 25,800; however, such apparatus is not designed to carry out a calculation for such a "," -containing numerical value.

Accordingly, for calculation by such conventional electronic apparatus, the user must input the numerical value without using the place-dividing symbol, or he must call the place dividing symbol-containing numerical value to eliminate the symbol prior to inputting the numerical data.

Besides, a conventional electronic apparatus provided with a multiple line display is capable of storing numerical data but not capable of carrying out calculation using the stored numerical data.

Therefore, there has been a demand for an electronic apparatus which is capable of not only inputting and storing numerical data containing place-dividing symbols but also carrying out calculations using the stored numerical data.

SUMMARY OF THE INVENTION

Accordingly, it is an object of the present invention to provide an electronic data storage device including means for storing numerical data containing place-dividing symbols, and means for executing calculation using the stored numerical data containing place-dividing symbols.

It is another object of the present invention to provide an electronic data storage device and calculator capable of using stored numerical data for calculation and comparing the calculated result with the stored numerical data.

Briefly described, in accordance with the present invention, there is provided means for storing numerical data containing place-dividing symbols and means for carrying out calculation using the stored numerical data containing place-dividing symbols. Since the electronic apparatus of the present invention is capable of inputting and storing numerical data containing place-dividing symbols and carrying out desired calculation using the stored numerical data containing place-dividing symbols, one knows the place of each digit of the numerical data, permitting the user to grasp the called numerical quantity quickly and to use the numerical data with place-dividing symbols directly in calculation.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a perspective view of the preferred embodiment as of the present invention;

FIG. 2 is an electrical block diagram showing the configuration of the electronic apparatus included in the embodiment of the invention of FIG. 1;

FIGS. 3(a) through 3(f) are charts helpful in explaining the steps of key operation for data designation and calculation and the resulting display state in each step;

FIGS. 5(a) through 5(f) are charts helpful in understanding the steps of key operation for calculation using numerical data containing a place-dividing symbol and the display state in each step.

DESCRIPTION OF THE PREFERRED EMBODIMENT

Figure 4:
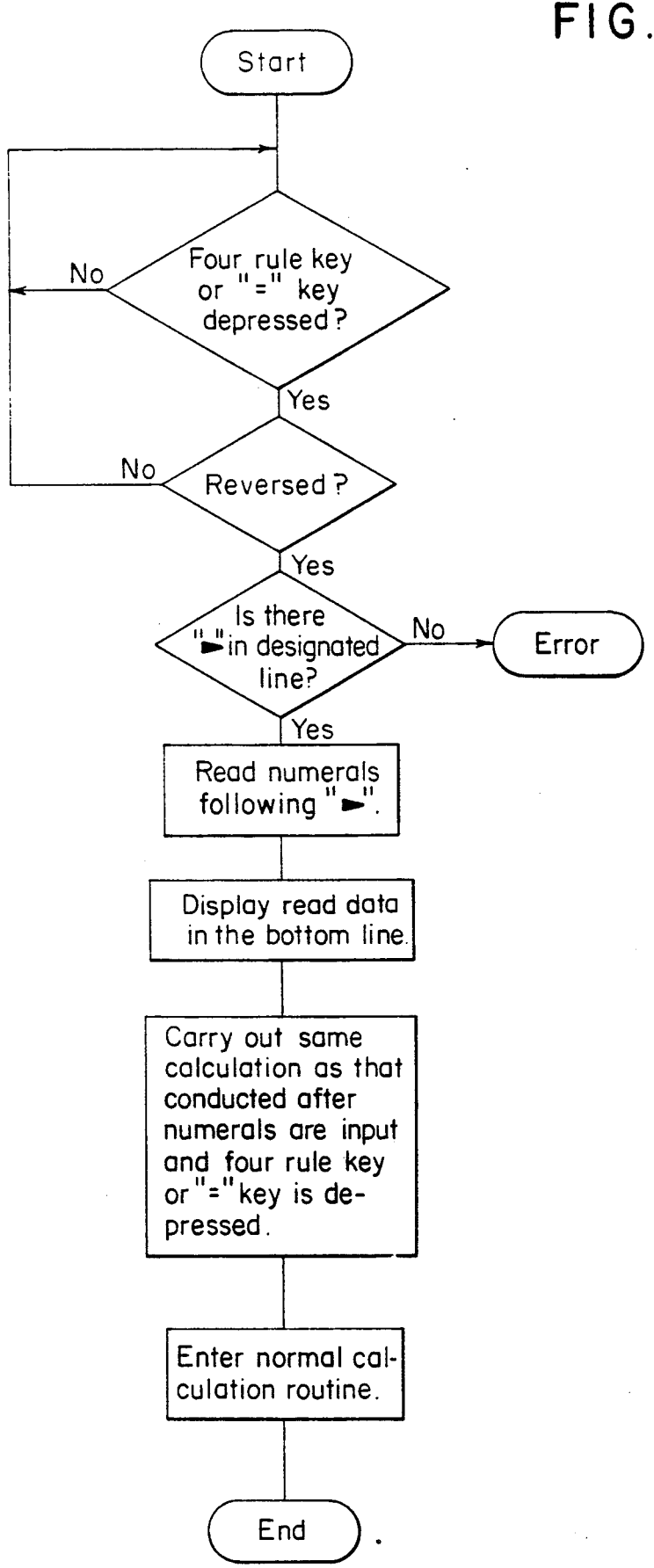
FIG. 4 is a flow chart illustrative of the operational process of data designation and calculation of the apparatus shown in FIG. 1.

FIG. 1 is a perspective view of an embodiment of the electronic data storage device and calculator according to the present invention.

Referring now to FIG. 1, a main body of a data storage device 1 is equipped with an input device in the form of a key board 2 for inputting numerical data and a display device 3, preferably an LCD, which is displayed numerical and other data. The display device is designed to present four lines of data.

The keyboard 2 is provided with ten keys 2a for inputting numerals, a decimal point key 2b for inputting decimal points, four rule keys 2c for instructing four rule calculation, an equal key 2d, a % key 2e for ordering the calculation of a percentage and a memory calculation key 2f for ordering data into memory.

In addition to the above keys, the keyboard 2 has a key 2g for a symbol "," which is input for dividing digits of numerical data. To input 25,800, for instance, an operator hits keys in the order of ② ⑤ , ⑧ ⓪ ⓪.

A key 2h is used to input a symbol "▶" which indicates numerical data. This symbol must be input prior to numerical data. With a touch of the key 2h, the subsequent data input is considered as a numerical data. In addition to characters and symbols, numerals may be also input before the key 2h is depressed, the numerals input prior to the symbol "▶" are not handled as numerical data. Characters and symbols may be input between the symbol "▶" and numerical data. The symbols "—" and "." input immediately before numerals are considered as part of numerical data if they are input after the symbol "▶". Numerals thus input are read as numerical data until a character or a symbol is input or until the last numeral on the line has been read. Subsequent numerals are not considered as numerical data.

2i is a mode setting or changing key, 2j and 2k are search keys, and 2l is a calculation data key for selecting calculation data. 2m and 2n comprise an up cursor key and a down cursor key which shift the cursor upward and downward, respectively.

FIG. 2 is an electrical block diagram showing the configuration of the electronic data storage device of the present invention. As in FIG. 1, reference numeral 2 denotes a keyboard (input device) and 3 a display device.

Referring now to FIG. 2, in response to data input from the keyboard 2, a CPU 4 stores the input data in a RAM (randam access memory) 5 and executes specified processing operations for effecting calculation and displays the results according to the program stored in a ROM (read only memory) 6.

To display data on the display device 3, the CPU 4 controls an LCD driver 7.

The device of the present invention is equipped with a communication terminal 8 so that it can communicate with other electronic apparatus. When a communication line, not shown, is connected to the communication terminal 8, the CPU 4 enables a gate circuit 9 to conduct, so that stored data is output to an external electronic apparatus or data can be received from an external electronic apparatus.

In FIG. 2, reference numeral 10 denotes a reset switch, and 11 a buzzer.

Now, the procedure of key operation for inputting data will be described with reference to FIGS. 3(a) through 3(f).

The mode setting key 2i is first depressed to select a four line display memory mode, and numerical data to be used in a calculation is input as shown in FIG. 3(a). Prior to inputting numerical data, however, the operator depresses the key 2h to input the signal "▶".

The search key 2j or 2k is next depressed to search data containing necessary numerical data, and the calculation data key 2l is depressed to make the data on the first line a reversed display, as shown in FIG. 3(b). The search key 2j is used for searching data in the forward direction, and the search key 2k for searching data in the inverse direction.

As long as data is displayed on all the four lines, it is possible to search desired data with the first line reversed.

The up cursor key 2m or down cursor key 2n is then depressed to make the line containing numerical data which is to be used in a calculation move up to the first line and become reversed, as shown in FIG. 3(c).

When one of the four rule keys 2c and the equal sign key 2d are depressed in this state, the CPU 4 checks whether or not the required data is reversed, and if it is reversed, checks whether or not the data contains a symbol "▶" indicating that the data comprises numerical data. All data input before the symbol "▶" will be ignored in a calculation. Characters and symbols input after the symbol "▶" but before the numerical data will also be ignored in a calculation. Accordingly, the data is read as numerical data to the end of the line or until a character or a symbol other than numerical data is input. Another condition for inputting numerical data is the same as that for a well-known ten-digit electronic calculator, except that negative values can be input. When the numerical data has been read, a calculation is conducted continuously by the same key operation as that following the input of numerals and depression of a four rule key 2c and the equal key 2d on the well-known electronic calculator.

When the numerical data has been input, the first line of the display presents the selected data used for calculation, while the second line is used for displaying symbols, and the third and fourth lines for numerals, thus permitting calculation to be performed in the same manner as in the conventional electronic calculator and permitting comparison with the numerical data presented on the first line, as shown in FIGS. 3(d) through 3(f).

When a search key 2j or 2k or a cursor key 2m or 2n is depressed, calculation can be cancelled. Needless to say, it is also possible to cancel calculation by operating a clear key, an ON key and an OFF key which are not shown.

FIG. 4 is a flow chart showing the processing corresponding to a key operation.

Now, a key operation for inputting and storing numerical data containing a place-dividing symbol and for a calculation using the stored numerical data will be described with reference to FIGS. 5(a) through 5(f).

A symbol "," is input at an interval of every three digits when inputting numerical data, making it easy to read the numerical data. According to the present invention, the key 2g is used for inputting the symbol ",". Alternatively, a certain key with its intrinsic function may be provided with another function for inputting a symbol ",". For instance, a "0" key may be provided with a first function of inputting "0" and a second function of inputting ",", so that "," can be input when the second function is selected.

Now, assume that the names of items and their respective prices (comprising numerical data containing a place-dividing symbol ",") are shown in three lines on the display panel as shown in FIG. 5(a), and that the operator is to carry out a calculation for the data on the second line.

When the calculation data key 2l is depressed, the display of the data on the first line is reversed as shown in FIG. 5(b). Then the appropriate cursor key is operated to shift data line by line. In this case, the down cursor key 2n is depressed once to shift the data on the second line to the top line as shown in FIG. 5(c).

Next one of the four rule key 2c is depressed. Here it is supposed that a calculation is to be conducted to obtain a price 80% of 10,000 for the chair shown on the top line. In response to this key operation, the data on the second and subsequent lines disappear, and the numerical data "10,000" shown on the top line appears instead, as shown in FIG. 5(d).

When the "8" and "0" keys are depressed to input a value for multiplying the above numerical data, "80" appears in place of "10,000" as shown in FIG. 5(e). When % key is depressed, the calculated result of "8,000" appears as shown in FIG. 5(f).

Reading a place-dividing symbol ",", the CPU 4 understands that numerical data will continue, and goes on reading the numerical data, thus making it possible to read ","-containing numerical data.

Figure 6:
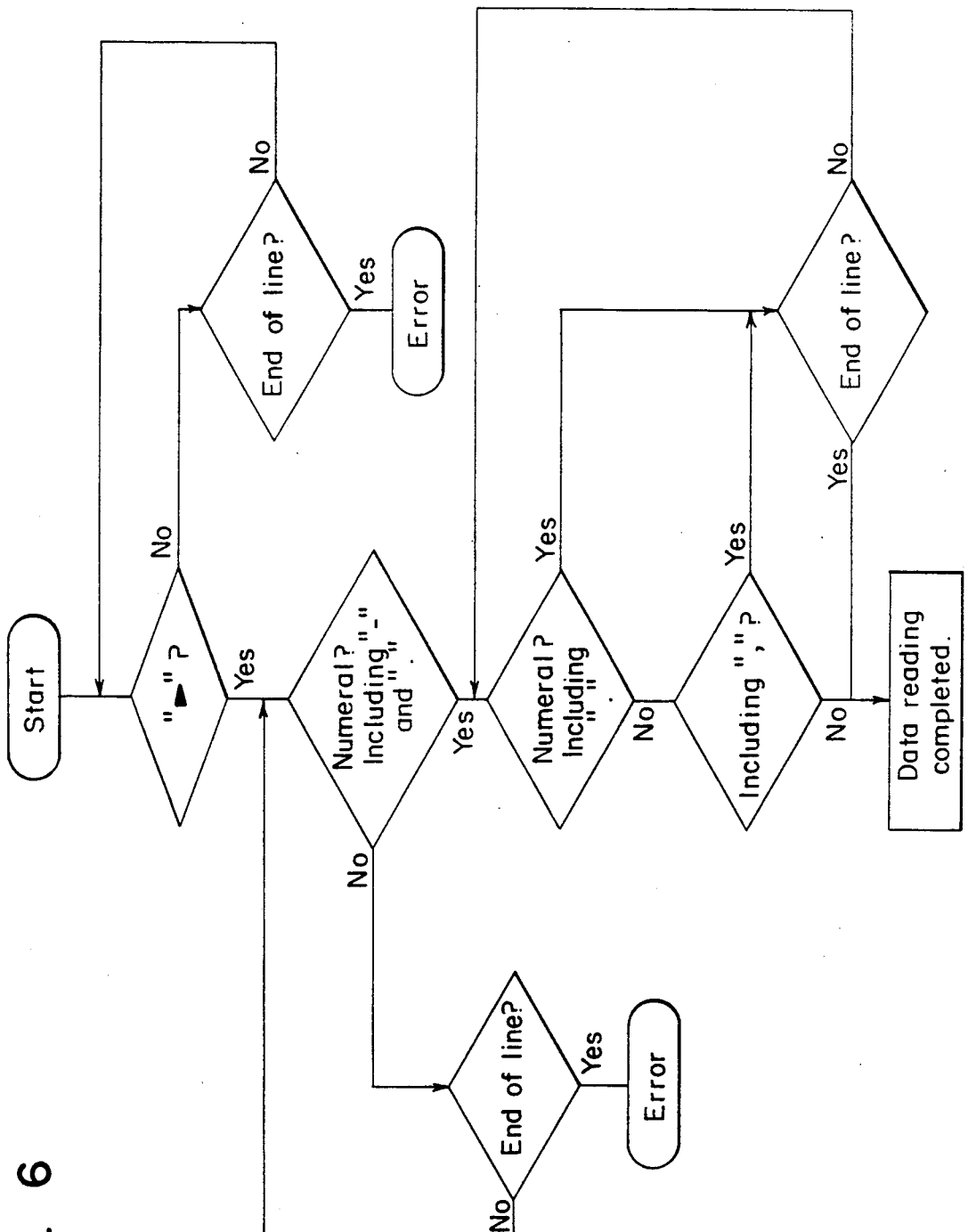
FIG. 6 is a flow chart further illustrative of the "read numerals" block shown in FIG. 4.

FIG. 6 is further illustrative of the "read numerals following" step of the a flow chart shown in FIG. 4 for explaining the process of reading numerical data containing a place-dividing symbol.

As shown, the CPU 4 reads the numerical data, identifying numerals, characters and symbols or particularly a symbol ",". Specifically, in reading a numerical data, the CPU 4 identifies a place-dividing symbol "," to make it possible to use the ","-containing numerical data in the same way as a numerical data without "," in calculation.

As mentioned above, the electronic memorandum book of the present invention can perform a calculation using a desired numerical data selected from among a plurality of numerical data inputted and stored in advance.

Of the data displayed in multiple lines, a desired block of data is shifted to the top (first) line by operating a cursor key. Then when required arithmetic keys are depressed, a calculation is carried out using the desired data.

Moreover, according to the present invention, the data on the top line is displayed so that numerical data which is to be used for a calculation is readily distinguishable. Further, since unnecessary data other than the selected desired data then disappear, a part of the display for multiple lines becomes available for showing the calculation process, permitting the stored numerical data to be used for the calculation, and the calculated result can be compared with the stored numerical data.

Needless to say, the electronic apparatus of the present invention can be used not only for four rules and percentage calculations as described above but also for various other calculations.

The electronic apparatus of the present invention has a display format of multiple lines each of which includes characters and numerical data which can be input and stored. The numerical data stored in the multiple lines are called, desired numerical data to be used for calculation is designated by operating a cursor key, the designated numerical data is reversed, and a calculation is carried out using the designated numerical data by the same key operation as for a normal electronic calculator.

Thus, according to the present invention, it is possible to input and store numerical data which contain placedividing symbols so that the data, when called, is easy to read. Moreover, according to the present invention, since the electronic apparatus can perform calculation using numerical data containing place-dividing symbols, the numerical data stored can be used directly for calculation, which is very convenient.

While only certain embodiments of the present invention have been described, it will be apparent to those skilled in the art that various changes and modifications may be made therein without departing from the spirit and scope of the present invention as claimed.

What is claimed is:

1. An electronic data storage device and calculator apparatus comprising:

a set of keys for inputting a plurality of data including character and symbol information in addition to numerical information and further including a dedicated key of said set of keys for inputting a symbol for separating sets of three digits of a numerical value and a dedicated key of said set of keys for inputting a forward direction indicating symbol, wherein data being input following input of the forward direction indicating symbol is defined as numerical information, said numerical information thereafter continuing until a succeeding non-numerical character is input or until the end of a data line is input;

means for storing and calling said data; and computer means for performing a calculation using said stored numerical information and said symbol for separating sets of three digits of a numerical value of at least one of said data.

2. The electronic apparatus of claim 1 and further comprising means for displaying said character and symbol information including said numerical information, said symbol for separating sets of three digits of a numerical value, and said forward direction indicating symbol.

3. An electronic apparatus of claim 2 and additionally including means for scrolling said data when called and wherein said means for displaying includes a plurality of display lines and including means for displaying a selected number of said plurality of said stored data on separate lines of said plurality of display lines.

4. The electronic apparatus of claim 3, and further comprising a set of rule keys for commanding a plurality of calculations, the activation of one of said rule keys further selecting one of said display lines displayed on said means for displaying and varying a display characteristic thereof relative to the other said display lines.

5. The electronic apparatus of claim 4, wherein said varying a display characteristic comprises reversing the display of said one display line.

6. The electronic apparatus of claim 5, wherein activation of one of said rule keys thereafter causes said means for displaying to inhibit the display of said other display lines, with the remainder of the display being used for displaying a subsequent calculation utilizing the numerical information and any said symbol for separating sets of three digits of a numerical value of data included in said one display line.

7. The electronic apparatus of claim 3 wherein said means for displaying comprises a liquid crystal display.

8. The electronic apparatus of claim 1, wherein said numerical information additionally includes symbols indicative of a minus sign and a period.

9. The electronic apparatus of claim 1 wherein said forward direction indicating symbol comprises an arrow type symbol.

10. The electronic apparatus of claim 1 wherein said forward direction indicating symbol comprises an arrow head pointing in a horizontal direction to the right of the previously input data.

11. The electronic data storage device and calculator apparatus comprising:

a set of keys for inputting a plurality of data including character and symbol information in addition to numerical information and further including a dedicated key of said set of keys for inputting a symbol for separating sets of three digits of a numerical value, and a dedicated key of said set of keys for inputting a direction indicating symbol wherein data being input following input of said direction indicating symbol is considered numerical information and continuing until another predetermined symbol or character is input except for input of symbols of a period or minus sign prior to said numerical information or until the end of a data line is input;

means for storing and calling said data;

means for performing a calculation using said stored numerical information and said symbol for separating sets of three digits of a numerical value of at least one of said data;

means for displaying said data including said character and symbol information, said direction indicating symbol, and said numerical information including any symbol for separating sets of three digits of a numeric value; and means for selecting one data line of said data displayed on said means for displaying and including display driver means for changing a visual display thereof relative to a remainder of data lines displayed, said selecting means thereafter causing said means for displaying to suppress a display of data lines other than said one data line, with the remainder of the display being used for displaying a subsequent calculation utilizing the numerical information of said one data line selected.

12. The electronic apparatus of claim 11 wherein said direction indicating symbol comprises an arrow head type symbol.

13. The electronic apparatus of claim 11 wherein said direction indicating symbol comprises an arrow head pointing in a horizontal direction to the right.

* * * * *